United States Patent [19]

Enikeieff et al.

BEST AVAILABLE COPY

[11] E Re. 29,057

[45] Reissued Nov. 30, 1976

[54] ELECTRONIC IDENTIFICATION SYSTEM EMPLOYING A DATA BEARING IDENTIFICATION CARD

[75] Inventors: Oleg C. Enikeieff, Bethesda, Md.; William H. West, La Habra; Dean C. Dye, West Covina, both of Calif.

[73] Assignee: Omron Tateisi Electronics Co., Kyoto, Japan

[22] Filed: Dec. 16, 1974

[21] Appl. No.: 533,062

Related U.S. Patent Documents

Reissue of:

[64] Patent No.: 3,221,304
Issued: Nov. 30, 1965
Appl. No.: 99,658
Filed: Feb. 23, 1961

[52] U.S. Cl. ..... 340/149 A; 221/2; 49/35

[51] Int. Cl.² ..... H04Q 9/00; E05B 65/00; G06F 11/00

[58] Field of Search ..... 340/149 A, 149 R, 146.2; 221/2; 49/35; 235/61.11 D

[56] References Cited

UNITED STATES PATENTS

| | | | |
|---|---|---|---|
| 2,315,741 | 4/1943 | Shafer et al. | 340/146.2 X |
| 2,714,201 | 7/1955 | Whitehead | 340/149 R |
| 2,754,496 | 7/1956 | Embry et al. | 340/149 R |
| 2,842,876 | 7/1958 | Chicoine et al. | 49/35 |
| 2,914,746 | 11/1959 | James | 340/149 R |
| 2,995,730 | 8/1961 | Marcellus | 340/146.2 X |
| 3,015,087 | 12/1961 | O'Gorman | 340/149 R |

*Primary Examiner*—Donald J. Yusko
*Attorney, Agent, or Firm*—Robert E. Geauque

[57] ABSTRACT

*An electronically alterable data card, identification card, and card decoder and encoder circuitry utilizing keyboard data input, data scrambling circuitry and data comparison on circuitry for validation and access purposes.*

27 Claims, 13 Drawing Figures

INVENTORS.
OLEG C. ENIKEIEFF
WILLIAM H. WEST
DEAN C. DYE
BY R. E. Beaugue
ATTORNEY

*INVENTORS.*
OLEG C. ENIKEIEFF
WILLIAM H. WEST
DEAN C. DYE

BY R. E. Beaugue
ATTORNEY

FIG. 7
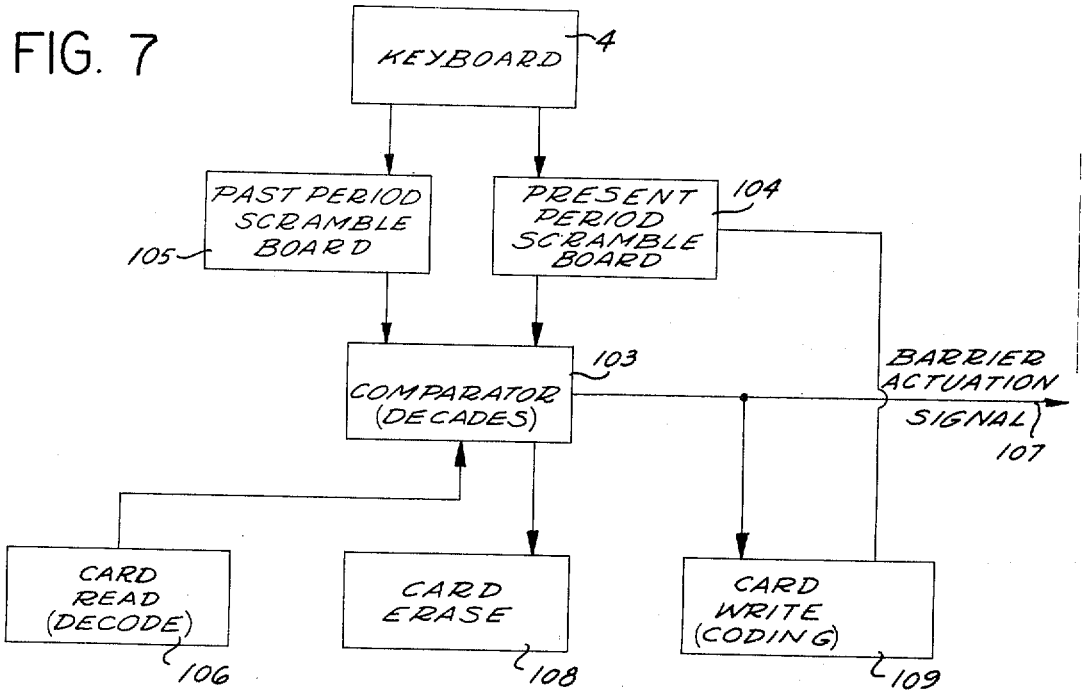
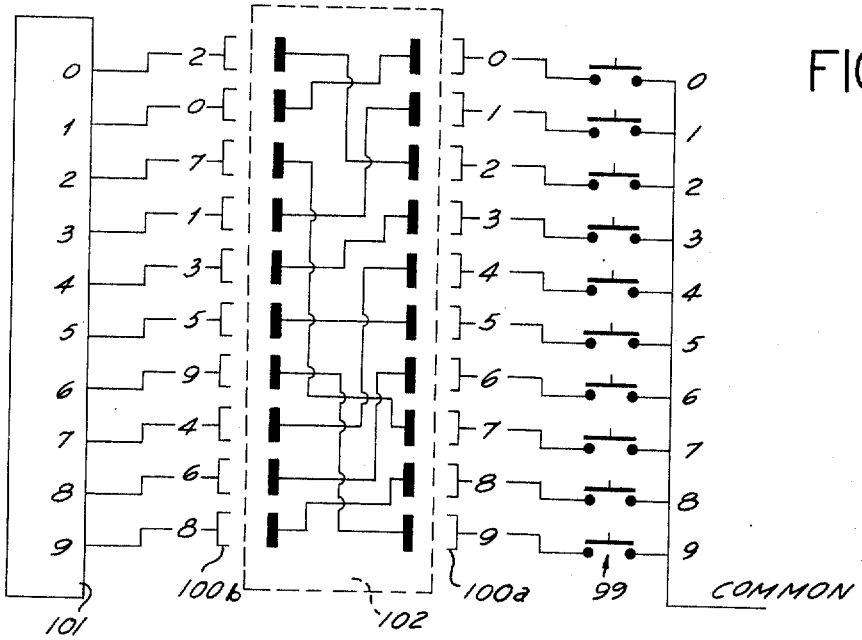
FIG. 9
INVENTORS.
OLEG C. ENIKEIEFF
WILLIAM H. WEST
DEAN C. DYE
BY R. E. Geauque
ATTORNEY INVENTORS.
OLEG C. ENIKEIEFF
WILLIAM H. WEST
DEAN C. DYE
BY R. E. Beaugue
ATTORNEY INVENTORS.
OLEG C. ENIKEIEFF
WILLIAM H. WEST
DEAN C. DYE
BY R. E. Geauque
ATTORNEY INVENTORS.
OLEG C. ENIKEIEFF
WILLIAM H. WEST
DEAN C. DYE
BY R. E. Geauque
ATTORNEY

ELECTRONIC IDENTIFICATION SYSTEM EMPLOYING A DATA BEARING IDENTIFICATION CARD

Matter enclosed in heavy brackets [ ] appears in the original patent but forms no part of this reissue specification; matter printed in italics indicates the additions made by reissue.

This invention relates to an electronic system for the identification of personnel and for the control of their entry to and exit from security areas.

Methods used heretofore for controlling personnel traffic into and from secure areas has generally involved the use of specially trained guards who identify an employee by his photograph contained on a pass which he carries. This method is known to have severe limitations from the standpoint of security and is also quite expensive since it requires a large guard force. The shortcomings of this system have resulted in the development of certain automatic or semi-automatic systems in which special keys, or cards, or the like, are issued to authorized individuals which cards may be sensed by an electrical device which controls an electric lock and will permit access to the secure area. Although this is considered to be an improvement over the first-mentioned method, it also suffers certain shortcomings and is not altogether fool-proof.

By the apparatus of the present invention the shortcomings of the prior art are substantially overcome. The medium of identification in the present invention is an identification card which can be coded and is processed to provide a protected magnetic storage surface capable of carrying codes which can be easily written, erased, and changed by the apparatus included in the invention. During entry and exit of the security area, an individual enters a memorized code into a keyboard by pressing several buttons thereon and thereafter inserts his identification card into a transport mechanism which carries said card through a magnetic reading path. The code entered into the apparatus is compared with codes on the card. The apparatus is also capable of reading additional codes which determines the area of higher security within the basic area to which admission is authorized for a specific card holder. If an appropriate code on the card is correct, and there is a proper correspondence to the buttons depressed, the individual is free to walk through a control channel. If the code is not correct, a barrier is automatically closed in front of the individual and an alarm is sounded to summon a guard. The code on the card can automatically be changed during entry or exit without the knowledge of the individual seeking access to the secure area. The system provides for several thousand different card codes.

It is therefore a principal object of the invention to provide a pass identification system which is reliable, flexible, and which eliminates human errors inherent in the guard identification card method used heretofore.

Another object of the invention is to provide an electronic security system for controlling the traffic of individuals through a secure area.

Another object of the invention is to provide an electronic identification system employing an identification card, the code carried therein being changeable at any time without the knowledge of the individual carrying the card.

Yet another object of the invention is to provide a novel and improved identification card and automatic apparatus responsive thereto for controlling an electrically operated barrier mechanism.

Still another object of the invention is to provide an electronic data processing system responsive to individual identification cards and memorized keyboard data for controlling traffic through a plurality of selectively classified security zones.

These and other objects of the invention will be more readily understood in connection with the following specification and drawings in which:

FIG. 7 is a block diagram illustrating the basic elements comprising the system and their functional interrelationship.

FIG. 9 is a diagrammatic representation of the scramble-plug apparatus employed in the apparatus.

The invention is based on a unique identification pass card. This card, in addition to standard information conventionally carried thereon, such as photograph, employee number, name etc., also includes an invisible magnetic code. This card is processed through a "read-out" device which is an integral part of the security gate or barrier which electronically compares the information read from the card with each individual's memorized code.

Figure 1:
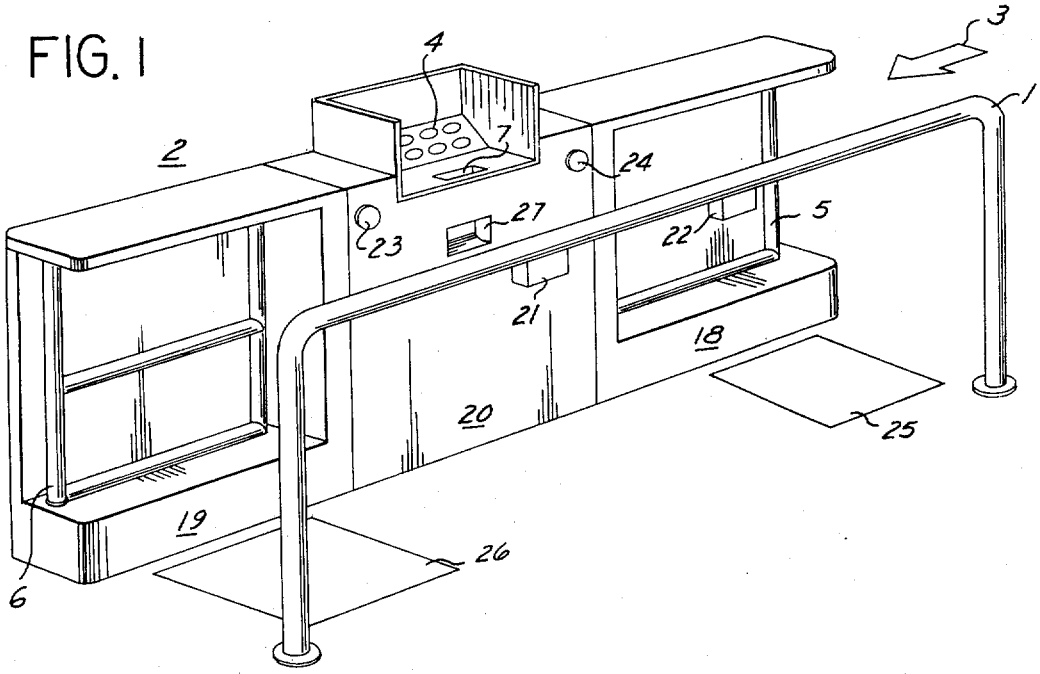
FIG. 1 is a perspective view of the external structure of the apparatus including the barrier and card receiving mechanisms.

Looking now at FIG. 1, individuals seeking admittance to the security area must pass through a path bounded by a guard rail 1 (or a wall or other barrier) and a console 2 housing the identification equipment. Together these may be considered as a gate 3. The memorized code is entered into a keyboard 4 by the individual seeking access to the secure area as he enters the gate 3 and the barriers 5 and 6 will remain open for admittance if the card code and the keyboard code both satisfy the electronic control unit. The card is inserted into receiving opening 7. If either one or both of the codes are incorrect, the barriers 5 and 6 are immediately closed and an alarm sounds and the monitoring guard is required. to open the barriers. If desired, barrier 5 may be functionally disconnected and barrier 6 serves as the operating barrier. Barrier 5 is therefore inactive and does not respond to the acceptance or rejection of an individual's identification card. Barrier 6 closes if the card is rejected or if the individual tries to enter without inserting his card into the card reader.

For personnel traveling through the system in the opposite direction, the functions of the barriers are interchanged. Barrier 5 becomes operative and barrier 6 becomes inactive.

Figure 2:
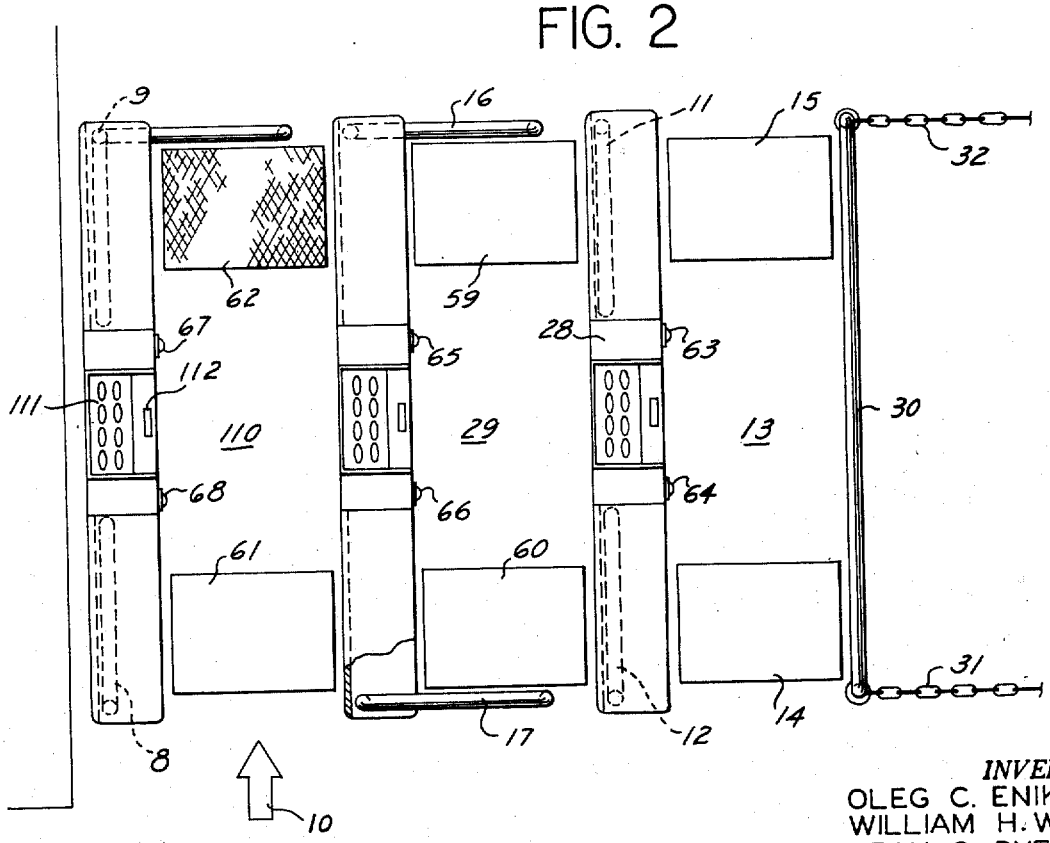
FIG. 2 is a plan view of a multiple installation of the apparatus of the invention.

In the plan view of FIG. 2 there is shown a multiple gate installation in which these alternative embodiments are illustrated. The selection of any one of these system configurations will be determined by the requirements of a particular installation and/or traffic control problems. To facilitate description of the invention, the preferred embodiment to be described will be confined to a "single open-barrier" system. It is contemplated, however, that four principle variations may be made in the system including: (1) a single open barrier system, (2) a single closed barrier system, (3) a double barrier open system, and (4) a double barrier closed system. In a single closed-barrier system, barrier 8 is inactive and barrier 9 is operating and normally open as shown. Traffic is in the direction of arrow 10. Validation of the identification card opens barrier 9 thus permitting the passage of the individual therethrough. Rejection of the card sounds an alarm and leaves barrier 9 in the closed position. If direction of entry is reversed, the function of the barriers would be interchanged. Barrier 8 would then become operative and barrier 9 would become inactive.

When the system is to operate as a "double-barrier" open system, both barriers are operative. This arrangement is shown at 11 and 12. Each barrier is in the open position and remains open when a card is accepted. Upon rejection of a card, both barrier 11 and 12 close, isolating the holder of the rejected card in the passageway 13. In the "double-barrier closed-system," both barriers 11 and 12 are operative and are normally in the open position and as an individual enters the passageway 13, the system is alerted by the individual either breaking a photoelectric beam or stepping on a treadle plate 14 or 15. This will cause both barriers 11 and 12 to close (closed barriers are shown at 17 and 16).

The "double open" or "double closed" systems do not require treadle switches or photoelectric beams for bi-directional operation.

In the "double-barrier" configuration, in which both barriers 11 and 12 are closed, one of the barriers may be pre-closed by the exit of the preceding individual, if desired. Acceptance of a valid card and keyboard entry will cause both barriers (11 and 12) to open and permit the next individual to enter the passageway 13. If the card and/or keyboard entry are invalid, barriers 11 and 12 will remain closed and an alarm will be sounded.

The "single open," "single closed," and "double closed" (with the pre-closed gate) system will accept traffic entering from either direction. Sequential operation of the treadle switches or of the photoelectric beams, automatically determines the direction of travel and activates the appropriate gate or gates.

By utilizing a code memorized by the employee and two additional codes invisibly or magnetically imprinted on the identification card, there results two elements of an equation which must be satisfied before the result, an authorized admittance, is achieved.

The possibilities of comprising the system, as by surreptitiously learning the individual's memorized code and additionally "reading," by electronic means, the number of pulses on each card track, are further reduced by the unique capability of the system to change the code on the identification card at any time and without the knowledge of the individual to whom the card has been assigned.

At any given time each card contains two sets of entrance codes; the "past period code" and the "present period code." The equipment is so designed that introduction of a new "present period code" in the apparatus of the system by the security officer or guard causes the "past period code" on each card to be erased and re-encoded with the new period code, simultaneously with the identification of the individual by means of the present code. Thus, at any desired time, which may be early in the morning prior to the entry of all personnel reporting to the secured area, on a particular day, all personnel will have one of the codes on their identification card changed automatically as they are identified and entered. The encoding of the card takes place only after the individual has been properly identified by reason of one of the two "previous period codes" on the card being correct. During the code change (re-encoding) process the individual's memorized code number is not changed.

The apparatus required for a single passageway is selfcontained within a console cabinet 2 that serves as the housing for the electronic equipment, a pair of pneumatically actuated barriers 5 and 6, a keyboard 4, and an identification card transport mechanism. The barriers may be contained in separate modules 18 and 19 which may be disconnected from the center section 20 containing the electronic equipment, the identification card transport and the keyboard 4. The barrier modules 18 and 19 contain all of the mechanical and pneumatic components necessary for the operation of the barriers except the compressor which may be located with the electronic equipment in the center cabinet section 20. This console 2, when installed in corridors and entrances to secured areas, serves as one side of the passageway through which personnel are admitted. In the instance of a single gate, a railing 1 of the same length is installed to define one side of the passageway.

Direction of traffic is determined by the interruption of a beam of light between light source 21 and photoelectric cell 23 and light source 22 and its associated photoelectric cell 24. Alternatively, treadle switches 25 and 26 may be used to sense traffic through the passageway.

The console 2 may be bolted to the floor or fastened by other suitable means and the only external connection required is a source of electrical power. A guard may be provided with keys to activate or de-activate the barrier as well as for periodic code changes, as will be explained more fully, hereinafter.

In any system in which a closed barrier is employed, the barrier may be mechanically adapted to permit it to be forced open by human effort in either direction if required for emergency exits. Experience has shown that a force not in excess of 15 pounds may be employed to open the barrier and lock it in an open position for emergency exit. An emergency opening will result in the sounding of an alarm; therefore, despite the fact that the barrier may be forced by an attempt to gain unauthorized entrance, this presents no loss of plant security. A guard oversees all gates at any one entrance and is alerted by the warning signal initiated by forcing a barrier.

It will also be understood that the barrier mechanism may be designed and padded in such a way that it will not injure or imperil personnel safety.

As shown in FIG. 2, the equipment console 28 of one passageway (13) may serve as the parallel boundary of an adjoining passageway (29) in lieu of a guard rail, as shown at 1 in FIG. 1. In a multiple installation, the last remaining passageway (i.e. 13) may be bounded by a guard rail 30 which is connected to chain barriers 31 and 32 or other means which may be readily removed by authorized personnel in the event of fire or other emergencies thus providing a large unimpeded exitway.

While the barriers shown and described (5, 6, 8, 9, 11, 12, 17, and 18) are in the form of gates or frame-like doors, pivotally mounted along one side thereof, it will be readily apparent to those skilled in the art that turn-stiles, or their equivalent, may be substituted for the barriers shown. For example, solid doors may be substituted for the barriers shown in those instances which the secure area must be more completely isolated from the entrance passageway.

The identification card is a major link in nearly all security systems now in use. In the electronic identification system of the present invention, the card 40 (as shown in FIGS. 3–6) may conveniently be, for example, three and one half inches long, two and one half inches wide, and approximately one sixteenth inch thick. Typically, the card may comprise a layer of clear vinyl plastic 34, to which is laminated an identification photograph 35. A transparent permanent pressure sensitive adhesive layer 36 may be used to bond the plastic layer 34 to the photograph 35. A magnetic oxide film 37, which may—for example—be 0.0015 inch thick is bonded to the photograph 35 by means of a permanent pressure sensitive adhesive 38. A second vinyl plastic layer 39 is laminated to the magnetic film 37. A face or picture side of the identification card 33 may have a format substantially identical to that used heretofore and may be fabricated from any suitable and well known material. The rear or non-picture side of the card may have a format which is either the same or different from prior cards as determined by individual requirements. Since most identification cards have little or no information on the rear side, an existing card may easily become converted for use in the electronic identification system of the present invention. Such conversion would require addition of a magnetic oxide film cemented to the rear face of the card or a lamination of the magnetic oxide carried in a thin (0.002 inch) protective vinyl plastic film bonded to the rear side of an existing identification card.

Figure 3:
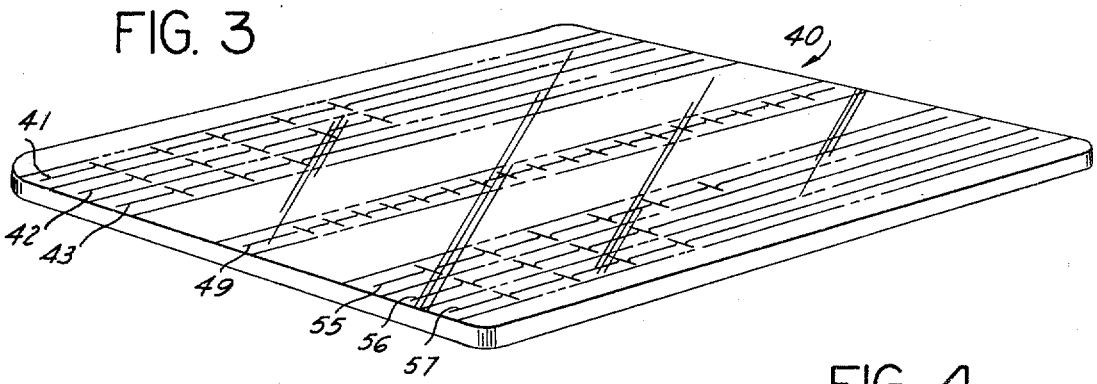
FIG. 3 is a perspective view of an identification card in accordance with the invention and has shown in graphic form, the coded information stored therein.
Figure 4:
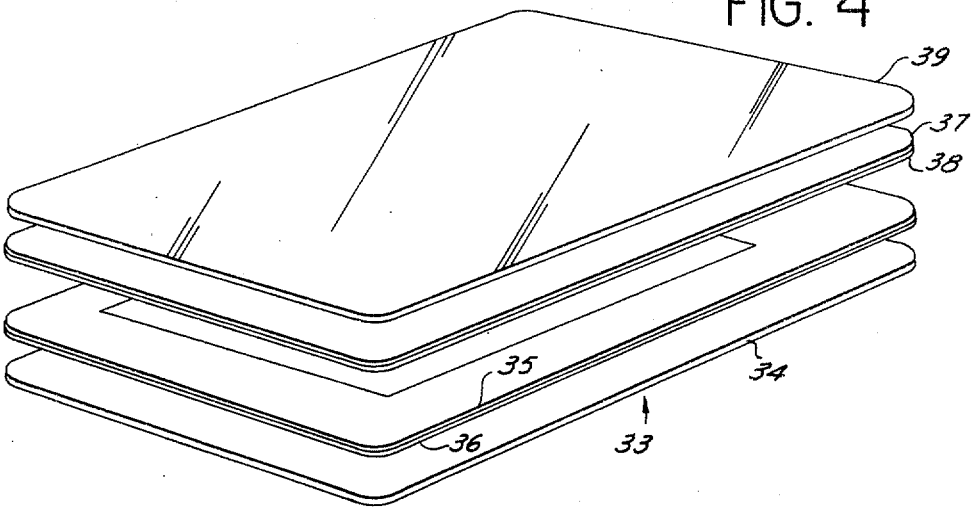
FIG. 4 is an exploded view of the elements comprising the card of FIG. 3.

The magnetic coding portion of the card 40 is divided into seventeen invisible tracks, a portion of which is schematically shown in FIG. 3. Tracks 41, 42, 43, and 55, 56, 57 contain the two "present period" codes and thereby control admittance to the main or perimeter entrances. Tracks 44 through 48 and tracks 50 through 54 (not shown in FIG. 3) control admittance to inner restricted or secure areas. The use and function of these tracks will be explained in detail in a subsequent section of this specification. Track 49, in conjunction with the tracks for the two "present period" codes provide for 20,000 different identification cards.

The thin plastic layer 39 over the magnetic coating 37 prevents the iron oxide from contacting any part of the recording system, and thereby provides a smooth, low friction head-to-tape operation. This will drastically reduce oxide rub-off, head build-up, and related problems, thus the identification card will have an extremely long service life. The protective layers 34 and 39 may be fabricated from vinyl plastic sheet 0.002 inch to 0.004 inch thick; this dimension will not significantly deteriorate the electrical response of the system.

Figure 5:
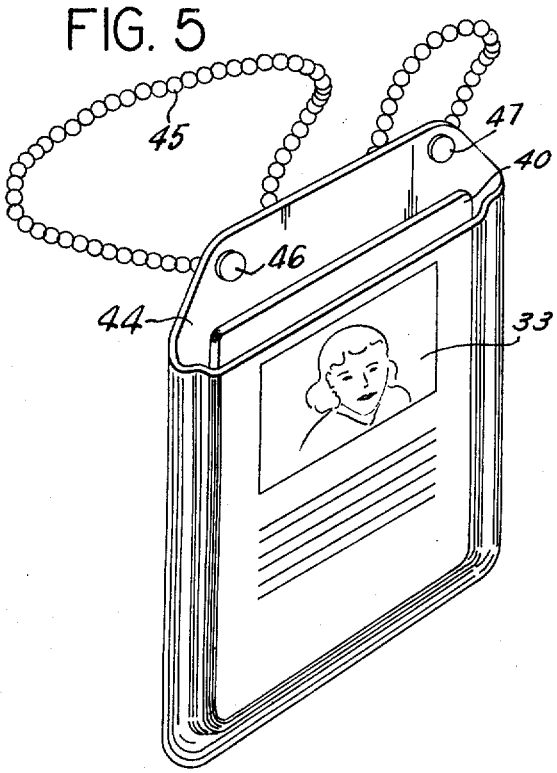
FIG. 5 is a perspective view of a card-carrying container suitable for holding the card of FIG. 3.

It is contemplated that the identification card 40 may be conveniently carried within a card holder 44 as shown in FIG. 5 which is fabricated from a transparent plastic. Holder 44 may be carried by means of a chain 45 which may be placed around the neck of the individual to whom the card is assigned. The card holder may conveniently be a flat shaped container, sized to accept the identification card. Two fasteners 46 and 47 are provided for the attachment of the carrying chain 45. It should be understood, however, that alternative carriers may be employed, as for example, the carrier may be equipped with a pin fastener or clips permitting the carrier to be attached to the individual's clothing. In addition to obviating the use of fasteners or other appurtenances which would protrude from the surface of the card 40 and impede its smooth passage through the card sensing apparatus, the use of a card carrier 44 also provides a degree of protection to the card which will prevent its being bent, torn, or otherwise mutilated to such an extent to impair its proper movement through the card sensing apparatus. The card holder 44, then, will act as a carrier for the card and provide protection for the card itself, thereby extending the useful life of the card.

The card receiving slot 7 is located directly in front of and at the base of the keyboard 4. Card 40 is inserted with the face side 33 (photograph) up and facing the individual. As will be obvious to one skilled in the art, a shoulder, keyway, or other suitable indexing means may be included in the structure of the card to require a specific orientation of the card before it may be entered into the card receiving slot, thus obviating the individual's visually orienting the card for face up admission to the receiving slot prior to entering the card and operating the system. A mechanical solenoid-operated stop prevents the full admittance of the card 40 until the final key on the keyboard 4 has been depressed. Since the card reading operation is a pulse counting function, speed variations in the card drive do not adversely affect the operation of the system. That is, the card drive does not have to move the card past the read heads with highly critical speed tolerance. Fixed read heads are mounted across the card passageway. These read heads are appropriately spaced to read tracks 41, 42 and 43 and 55 through 57 which contain the two "period codes". Erase heads are located at a suitable distance beyond the rear heads. The spacing of the erase heads on the rear heads is sufficient to allow the card to be read and accepted before it is erased. The erase heads are selected so that they are capable of erasing a wider track of magnetic impulses than is placed on the card. The use of erase heads capable of erasing a wider track than recorded insures that all magnetic impulses of the previously recorded track are erased. Six re-record heads are employed to write on the new period code. Suitable driving rollers and idler rollers are spaced throughout the card passageway insuring that the speed and position of the card is maintained and that the card is forcibly ejected into a holder 27 in the front of the apparatus.

Passageway console

The active equipment portion of the apparatus may be conveniently packaged into a three-section console 2. The center section 20 may conveniently contain the keyboard card transport and the electronic equipment for reading, interpreting and/or rejecting card. The sections on either side (18–19) of the center section 20 may contain the barrier gates 5 and 6.

A recessed well is provided in the center of the center section for accommodating the keyboard 4. The key switch layout arrangement of the keyboard is shown at 58 in FIGS. 8 and 11. An entrance slot 7 to accommodate the identification card is located directly in front of the keyboard 4. An open card-return receptacle 27 is located below the keyboard at a level convenient to recover the card after its having been read. A removable panel may be provided at the rear of the equipment console for maintenance; a locked door in the console may be provided through which the security guard may have access to the code changing plug-in unit. The construction and operation of the code changing unit will be discussed in a subsequent section of the specification.

Photoelectric detectors (21–24, 63–68) are located in the center section for indicating traffic through the passageway. As will be obvious to those skilled in the art, photoelectric detectors may be replaced or augmented by treadle switches (14–15, 25–26, 59–62). The preferred embodiment of the apparatus employs a combination of both photoelectric detectors and floor treadle switches which are responsive to the flow of traffic to indicate both the presence of individuals (entrants) passing through the channel and their direction of travel.

An electrically operated air compressor of any well known and suitable construction may be located within the equipment console 20 for operation of the pneumatic cylinders which actuate the barrier gates (i.e. 5–6, etc.).

Barrier mechanism

The barrier mechanism comprises two half doors 5 and 6 pivotally mounted along one edge thereof. Typically, these doors may be constructed of tubular aluminum having a resiliently padded cover. The operation of the barrier system is selectively adjustable so that the doors may be made to open or close within any pre-set time interval between 2/10 second and 2 seconds. Individual adjustment may be provided for each barrier door. The opening time and the closing time may be independently set. Thus, each door can be rapidly opened and slowly closed, or vise versa. It has been found that the optimum time to open and close the barrier is of the order of one second.

The barrier actuation mechanism may comprise a pneumatic cylinder with appropriate solenoid valve controls. The use of a hydraulic snubber of any suitable and well-known construction will permit the barrier to be opened or closed within an extremely short period of time; snubbing the barrier before reaching the end of its full travel eliminates the need for stops and jambs.

Keyboard

The keyboard 4 located on the center console contains 30 push button or key switches. These switches are grouped in three rows of ten and carry thereon suitable indicia as shown at 58 in FIG. 8. Typically, these indicia would include the letters "A" through "K", excluding the letter "I," on the first rows of switches. The remaining two rows of switches will carry the numbers 0 through 9. Each row of switches is mechanically interlocked to permit only one switch in each row to be activated at any one time, thus only three switches on the keyboard may be operated at any one time to enter the entrant's assigned code number. The electrical circuit through the switches is such that one switch in each of the three rows must be activated before the card stop in the card transport mechanism is released.

Control circuitry

Figure 8:
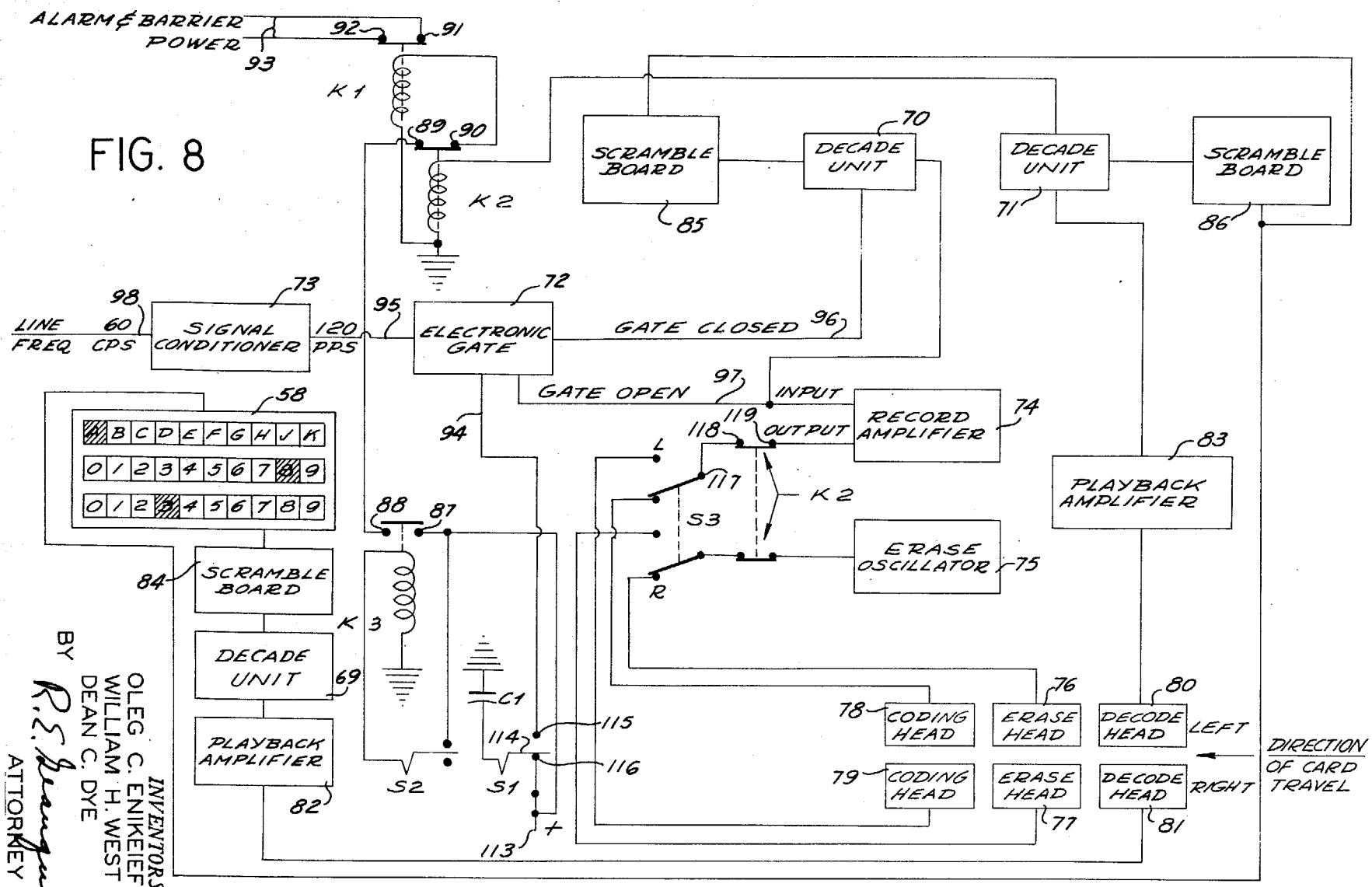
FIG. 8 is a comprehensive diagram of the apparatus, illustrating details not shown in FIG. 7.

The control circuitry may be packaged as modular plug-in units which are mounted on a chassis in the console 20. These modules are shown in FIG. 8 and comprise the following:

(1) Decimal counter decades (69–71)
(2) Electronic gate (72)
(3) Signal conditioner (73)
(4) Record amplifier (74)
(5) Erase oscillator (75)
(6) Erase heads (76–77)
(7) Coding (Write) heads (78–79)
(8) Decode (Read) heads (80–81)
(9) Playback amplifiers (82–83)
(10) Scramble boards (84–86)
(11) Relays K1, K2, and K3; switches S1, S2, and S3; and capacitor C1.

Certain of the functional units represented in the block diagram may take the form of any one of a number of electronic circuits or devices, well known in the art, capable of performing the assigned function; therefore, it is deemed unnecessary to show circuit or structural details for these units. Furthermore, the logical operations performed by the apparatus shown in FIG. 8 is considered to be described in sufficient detail to enable the invention to be practiced by those skilled in the art.

Decimal counting decades

A number of decimal counters (decades) are employed in the control circuitry. Blocks 69–71 shown on FIG. 8 are identified as decade units; it should be understood, however, that each of these blocks comprises a plurality of cascaded decimal counter decades, each of which is capable of counting electrical pulses one through ten. Three decades (71) are employed to decode the "previous code," three decades (70) are used to decode the "present code" and three decades (also in decade unit 70) are used to re-encode the "previous code." A decimal counting decade (69) is also associated with the keyboard 58. As each electrical pulse is received by the decades, it is stored as a voltage level. A single pulse represents the first level, two pulses the second level, and so on through ten levels. Each voltage level is paralleled by one of the key switches on the keyboard 58. Therefore, the level at which an output pulse will be obtained from the decimal counting decade 69 is preset by a corresponding key switch on the keyboard. For example, upon reaching the count 3, the third voltage level would appear at the output.

Figure 12:
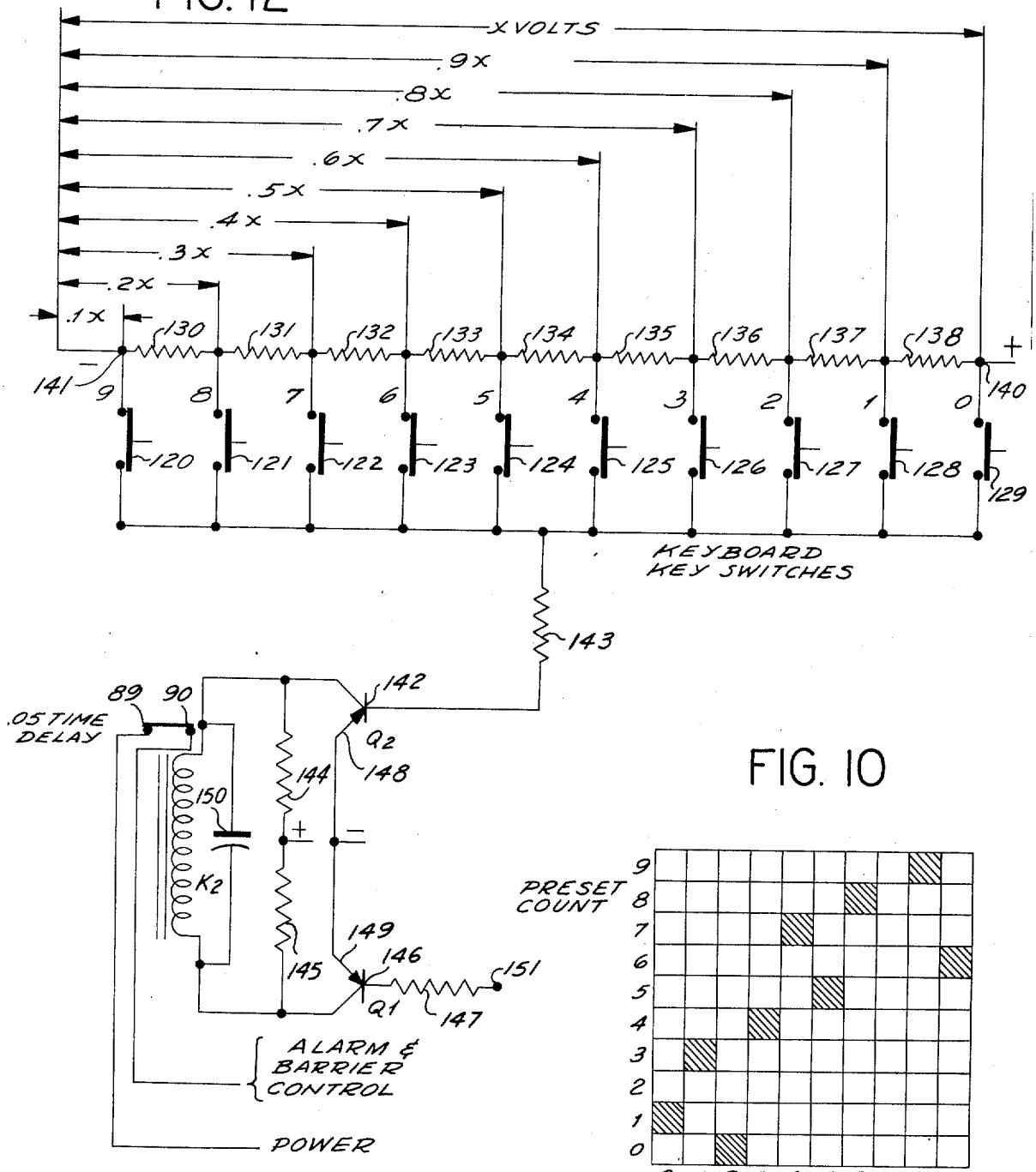
FIG. 12 is a schematic diagram of the keyboard and matrix apparatus.

A more detailed description of this circuit is provided in a subsequent section of this specification in connection with FIG. 12.

Since there are three decimal counting decades for each code, there are 1000 combinations of step levels or codes. The preset level output pulses from each decade operate three relays (K1, K2, and K3) with their contacts (87 through 92) in series. The correct selection of a particular combination of levels, therefore, energizes the barrier control circuit 93.

The start and stop commands for the decimal counting decades are generated by the electronic gate 72 circuit described in the following section.

Electronic gate

Electronic gate 72 comprises an electronic switch having a control input 94, a signal input line 95, a normally-closed signal output 96, and a normally-open signal output 97. The presence of a control signal voltage on input 94 will reverse the normally-open and normally-closed conditions of outputs 97 and 96, respectively, thereby diverting the pulse train input, appearing on line 95, to one or the other of the output lines (96 and 97). This action permits pulses to be diverted from one or the other of the sets of decades within decade unit 70, as well as controlling pulses into record amplifier 74.

Signal conditioner

The signal conditioner accepts the 60 c.p.s. line frequency, supplied at its input 98, and provides a train of square-wave pulses, at a repetition rate of 120 pulses per second, at its output (line 95). This circuit reduces the 120 volt, 60 cycle line power to the proper voltage amplitude and then, by means of full-wave rectification, provides a 120 p.p.s. pulse train. These pulses are shaped to form square waves as is desirable for reliable operation of the decimal counting decades.

Erase, write, and read heads

The magnetic coding (write) and decode (read) heads may comprise a plurality of multiple-track heads of conventional construction mounted in the card transport mechanism in staggered relationship to permit the required mechanical access to all 17 tracks on the card. Separate erase heads may be used between the coding and the decode heads.

Scramble boards

Figure 10:
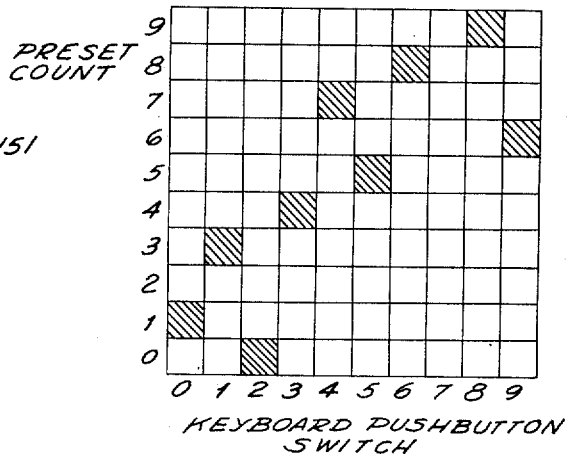
FIG. 10 is a diagram illustrating the logical selection performed by the keyboard apparatus of the invention.

Scramble boards are utilized to change the electrical configuration of the keyboard. There are three separate scramble boards (84, 85 and 86) two of which are employed to correlate the keyboard entry with the data read by the two (right and left) decode heads, and the third scramble board is used when it is desired to write a new code on the card via either the right or the left coding head. Each of these scramble boards is made up from three scramble plugs. Referring now to FIG. 9, there is shown in simplified form, the wiring interconnection of a typical one of the scramble plugs comprising a scramble board. All wires from a corresponding row of keyboard switches (one row being shown at 99) terminate at a plug receptacle 100a. The preset circuitry 101 of a corresponding decade in the decade unit also terminates at this receptacle (100b). A mating plug 102, carrying a plurality of jumper wires, communicates these two groups of circuits via receptacle terminals 100a and 100b. Up to 1,000 plug configurations may be made to provide scramboards which will accommodate as many as 1,000 electrical configurations of the keyboard; it being assumed that there are three scramble plugs per scramble board and three rows of keys on the keyboard. The scramble plug shown in FIG. 9 will cause key switch "0" to preset a count of "1" in the decade. Key switch "4" will preset a count of "7" in the decade, and so forth. The entire code pattern for the scramble plug shown in FIG. 9 is shown in FIG. 10. It will be understood that one scramble plug on each scramble board correlates the letters A–K (less I) to selected discrete count levels in the associated decade.

System operation

The basic functioning of the system will now be analyzed with reference to FIG. 7, which is a simplified block diagram of the control circuits. The code entered into keyboard 4 is supplied to a comparator 103 through two (or more) scramble boards 104 and 105 whose purpose is to relate a single memorized code unique to each entrant, to sets of coded information magnetically written on a data-bearing card assigned to the entrant. The code written on the card may be changed frequently, yet may always be related to the memorized code by recognition (comparing) circuits within the apparatus, provided only that the card has been timely updated by automatic re-encoding.

Each data-bearing card contains three sets of data. One set, which may physically be located along the central (longitudinal) axis of the card, is used solely to control admittance to various inner security areas; this set of data remains fixed. For the present discussion, only the sets of data located on either side of the "inner area" data will be considered; these are designated as the "present period code" and the "past period code.".

In all cases, the "period codes" are derived from the memorized code by transmitting the memorized code through a scramble board. Thus, the actual past period or present period code written on a given card will differ from all other cards. The "pattern" or "key" to relate the memorized code to the "period" code is carried in a selectively changeable scramble boards, which is common to all data bearing cards. In a practical system, only one of the two period codes would be changed at a time—thus giving rise to the terminology "past" period and "present" period. Comparator 103 determines whether the proper correspondence (via the scramble board) exists between keyboard entry and at least one set of the coded information read by means of the card read head 106. If the "unscrambled" keyboard entry does not correspond to either the past period code of the present period code, a barrier actuation signal is supplied on line 107 which activates the barrier to prevent entry and also sounds an alarm to signal the guard. If correspondence does exist, the information tracks on the card, carrying the present period code, may be erased and rewritten (re-encoded) with the present period code unique to that entry. This is done to permit updating of cards having only one correct code. The card write (coding) head 109 re-encodes the card as determined by the present period scramble board 104 and the keyboard entry. Changing scramble board 104, therefore, permits re-encoding all cards after proper identification, leaving what was the "present period code" as the "past period code".

The use of pulse counting techniques makes the system relatively independent of card drive speed. It should be understood, however, that either static card sensing techniques, or frequency-responsive or other dynamic card sensing methods may be substituted and/or adapted for use in the system. Also, since numbers must be identified, and/or rewritten, for each entrant, either parallel counting circuitry or time-shared counting circuitry could be used. In the detailed description of the system operation which follows, it will be assumed that the code recognition apparatus is a pulse counting system which employs a pulse generator and a preset counter in which the keyboard information is scrambled and then used to preset a decade counter. The pulse information, as read from the card, is fed to the counter which in turn delivers an output if the card does not correspond to the present number. Writing or re-encoding of the card is similarly accomplished by delivering pulses from the pulse generator to the write or coding head until the preset count has been reached.

In the discussion which follows, it will be assumed that the system further comprises a "single barrier" system. Its operation will be analyzed in response to three separate entrants, each attempting to gain admittance to the passageway for ingress to or egress from, the secured area. It will be assumed that barrier 9 is the active barrier. With traffic in the direction of arrow 10, barrier 9 will be at the exit of passageway 110. In the three cases to be discussed, the entrants will fulfill one of the following conditions:

(I) The first entrant is authorized and carries a valid identification card.

(II) The second entrant carries an invalid identification card.

(III) The third entrant does not carry an identification card.

In the first instance, entrant I enters the passageway 110 and alerts the system by interrupting the photoelectric beam 68 or by stepping on the treadle switch 61. This action establishes the ready-for-use condition of the system. The entrant then stops at the keyboard 111 to press three memorized number keys and insert his identification card into the receiving opening 112. It is assumed that the keyboard is activated in the correct sequence as is necessary, i.e. the first letter or digit must be entered in the top row, the second digit in the center row, and the third digit in the lower row. The identification card may be inserted either prior to, or following, the keyboard entry. Depressing the last key switch releases the mechanical stop and allows the identification card to be transported past the decode heads. Both the present period and the past period codes, as recorded on the card, are read and compared with the code appearing in the decimal counting units 69 and 71 by the depressed keys. The identification card is validated and ejected into the slot below the keyboard. The authorized entrant may then pick up his card and proceed through the passageway.

Entrant II, having an invalid card, enters the passageway 110 interrupting the first photoelectric beam 68. This clears the system of the information previously entered into it by entrant I and establishes the ready-for-use condition. Entrant II depresses the three keyboard keys and inserts his identification card into the receiving opening 112. Since the data on the card does not agree with the code appearing in the decimal counting units 69 and 71 in response to the keyboard entry, the card will not be validated and as the card passes the decode 80 and 81 heads, a switch closure will result. This switch closure will sound an alarm and cause the barrier gate 9 to close immediately. The sounding of the alarm and the closing of the barrier 9 alert the guard that an unauthorized entrant has entered the system. Barrier 9 remains closed until it is returned to the open position by the action of the guard closing a key operated switch.

Entrant III, not having an identification card, enters the passageway 110 and interrupts the first photoelectric beam 68. This action clears the information set into the system by the previous entrant. The entrant then attempts to pass through the passageway 110 without inserting a card into opening 112. Upon interrupting the second photoelectric beam 67, the alarm will be sounded and the barrier will be closed immediately. To further ensure that entrant III cannot penetrate the system by walking rapidly, a timing solenoid-activated valve is installed in the pneumatic system which operates the barrier. When both photoelectric beams (68 and 67) are interrupted in sequence without an interventing card insertion, this valve operates to reduce the barrier closure time to 0.2 second.

A closed barrier system would operate in a similar manner with the exception that the barrier would be in a normally closed position and a valid keyboard and card entry would open the barrier. Any discrepancy in the keyboard entry or the card reading function would turn on the alarm without opening the barrier. As is obvious, an unauthorized entrant cannot pass through a closed barrier system without using a card since a card reading function would be necessary to open the barrier.

The use of photoelectric beams or treadle switches, or combinations thereof, impart the bi-directional traffic characteristic to the passageway. As is well known to those skilled in the art, traffic direction can be ascertained by sensing the sequence in which a pair of photoelectric beams or treadle switches are closed.

The electronic and mechanical functioning of the system is best described by analyzing the circuit operation utilized in response to a single digit entry of the keyboard. The circuitry involved is shown in FIG. 8.

Assume as an example, a keyboard entry of A83; the circuitry may be followed first for the letter A. The circuit is shown with switch S3 in the recode position for the left side of the card, and the left side of the card will be read for the past period code. A source 113 of direct current power is supplied through the normally closed contacts of switch S1 to capacitor C1. The direct current also is supplied to contact 87, relay K3.

When A83 is entered into the keyboard 58, three corresponding circuits are completed to scramble boards 84, 85, and 86. A scramble plug on board 86 will re-encode the "A" to represent "5" in the associated decimal counting decade unit 71. This represents one digit of the past period code on the left side of the card. A scramble plug on board 85 re-encodes the A such that it will represent 9 in decade unit 70; this corresponds to one digit of the new period code which is to be rewritten on the left side of the identification card in place of the existing past period code. A scramble plug on board 84 re-encodes the A to appear as 2 in decade unit 69 which corresponds to one digit of the present period code in the identification card (on the right side of the card).

When the identification card is moved past the decode heads, the number of pulses on the card are counted. The left decode head 80 will detect five pulses on the card which are transmitted to the playback amplifier 83. The amplified pulses from playback amplifier 83 are supplied to decade unit 71. Since the number of pulses counted (5) corresponds to the preset count of five in the counter (derived from the "A" preset by manual entry into the keyboard 58), a voltage is generated by decade unit 71 which energizes relay K2. The opening of contacts 89 and 90 of K2 indicate that this digit is correct and prevents energization of relay K1. The energization of K1 would activate the barrier and the alarm circuit 93 via contact 91 and 92.

Switch S2 is mechanically linked to the card transport mechanism so that it will be closed by the card prior to the exit of the card from the card transport mechanism. If the number of pulses counted is incorrect, as a result of an invalid card, no voltage will be generated by the counter and contacts 89 and 90 of K2 will remain closed. Thus, when K3 is energized, power will be supplied via 87 and 88 of K3, and contact 89 and 90 of K2, thereby energizing K1. This in turn will activate the barrier and sound the alarm via contacts 91 and 92 and prevent erasure and re-encoding of the present code onto the card.

Reading and comparing conditions on the right side of the card is accomplished in a similar manner. Assuming one of the two codes on the card is correct, the coding circuitry will function to permit erasure and re-encoding of the present period code or, as in this example, replacement of the past period code with a new period code.

As the card passes under the erase head 76, the code is erased from the left side of the card. The identification card then travels past the coding head 78 and the forward edge of the card will operate switch S1 to close moving-contact 114 to fixed contact 115. The time of operation of switch S1 with reference to the relative position of the card, and the coding head, controls the position of the coding pulses and their proper location on the card. Switch S1 disconnects the power input (113) to capacitor C1 and permits this capacitor to be discharged into electronic gate 72. The discharge voltage opens the electronic gate 72 and allows square wave pulses (120 p.p.s.) to be supplied to decade unit 70, from the signal conditioner 73.

If capacitor C1 has triggered the electronic gate 72, the pulse output from the signal conditioner 73 is supplied to decade unit 70. The decade registers each pulse and stops counting when the count reaches the preset number selected by the keyboard entry and the corresponding scramble board (85) output. In the assumed case, the first digit of the preset number is 9. When nine pulses are received, the decade emits a voltage which is supplied back to the electronic gate thereby closing it. Simultaneously, pulses being counted are amplified via record amplifier 74 and written on the card via contacts 117–118, switch S3 and coding head 78. Only nine pulses are written on the card since only nine pulses are permitted to pass through the electronic gate 72 before the gate is closed by decade unit 70.

After all authorized entrants have gained admittance through the system, scramble board 84 is changed to agree with scramble board 86 and the right side of the identificaion card will then carry the present period code; the left side will carry the past period code each time an identification card is inserted into the reader, the side of the card which is to carry the present period code is erased and rewritten, provided one of the conditions on the card is correct. This feature permits cards containing only the past period code to be updated to contain both codes.

FIG. 12 is a simplified schematic diagram of the comparison circuit. There is shown one row of key switches (120–129). Each key switch communicates with a tap on a voltage divider, comprised of series resistors 130–138, which will supply a given reference voltage relative to one or the other of the supply terminals 140 and 141, for comparison with each counting step of the associated decade. The voltage divider to which key switches 120–129 are connected is provided with a source of D.-C. power applied to terminals 140 and 141. Nine resistors of equal value (130–138) are serially connected across the power supply terminals 140 and 141. Thus, it will be seen that a unique voltage will appear for each key switch closed. The reference voltage selected by any given key switch is applied to the base 142 of transistor Q2 via series resistor 143. Transistors Q1 and Q2 comprise two arms of a bridge circuit, with resistors 144 and 145 comprising the opposite two arms of the bridge. The coil of relay K2 serves as the bridge load. A D.-C. power source is supplied across the bridge at the juncture between the emitters 148 and 149 of transistors Q1 and Q2 and the juncture between resistors 144 and 145. Capacitor 150 is shunted across relay coil K2 to stabilize its operation. The output voltage level from the decade unit is applied to the base 146 of the transistor Q1 via series resistor 147. If the voltage applied to the base 146 of Q1 is less than the reference voltage applied to the base 142 of Q2, the differential current will energize relay K2 closing contacts 89 and 90. Similarly, if the voltage applied to the base 146 of Q1 is greater than the reference voltage applied to the base 142 of Q2, differential current flows and relay K2 will continue to be energized. When the voltage applied to Q1 from the decade (terminal 151) is equal to the reference voltage applied to Q2, no differential current will flow through relay K2. This will open contacts 89 and 90 of K2, thus indicating that the number of pulses counted is equal to the present number.

Figure 13:
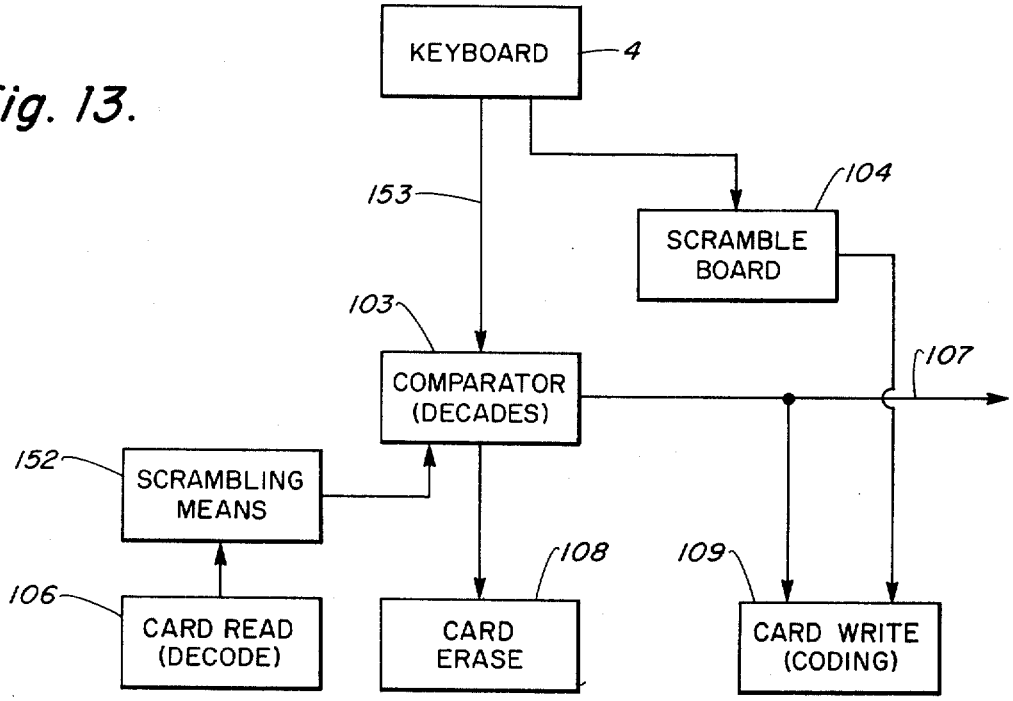
*FIG. 13 is a block diagram illustrating an alternative embodiment of the apparatus of FIG. 7.*

*FIG. 13 illustrates the functioning of an alternate embodiment of the system wherein the memorized code, unique to each entrant, entered into the keyboard 4 is supplied directly to comparator 103 via line 153 for comparison with sets of coded information magnetically written on the card. The card read head 106 is connected to comparator 103 through data scrambling means 152. Scrambling means 152 may, for example, resemble the scramble-plug apparatus for FIG. 9 only connected in reverse (that is, circuit 101 would connect to read head 106, and terminals 100a would connect to comparator 103). Comparator 103 determines whether the proper correspondence exists between the entry in keyboard 4 and at least one set of "unscrambled" coded information obtained by means of the card read head 106 via scrambling means 152. Comparator 103 responds to the keyboard entry and the unscrambled card entry in the same manner as to the analogous inputs described previously in connection with FIG. 7.*

Admittance to inner security areas

As briefly mentioned heretofore, the system may be adapted to provide access to a plurality of security areas, each of which may be confined within a larger surrounding security area.

The card may provide for entrance into up to ten inner security areas. The "inner area" codes are magnetically written on the identification card along the ten tracks located either side of the central axis between the "period" codes. The operation for admittance is the same as for the main or peripheral entrance with the additional requirement that the inner area code on the card must correspond to the area code assigned to the passageway through which the person must pass to enter the inner area. The inner area codes are not changed, but once assigned, remain on the card until the individual is reassigned to a different inner area or is no longer authorized to be admitted to the area. Tracks 4 through 8 and 10 through 14, thus may be assigned to the inner secure area coding.

The apparatus for controlling entrance to an inner secure area is substantially the same as that used for the main or peripheral entrance. That is, it must read and compare the period codes, but in addition, must read one of the ten inner tracks. A read head is adapted to read an inner secure track designated for each specific area. For example, if a pulse is located on track 4, the read head for area 4 is positioned to read track 4. Admittance can only be obtained by means of a card having a magnetic pulse recorded on track 4.

It should be understood that a single given card may have inner security area pulse conditions recorded on more than one of the inner security tracks thus permitting the individual, to whom the card is assigned, to gain admittance to a number of inner secure areas. Thus, an individual cleared to enter all ten inner secure areas would be assigned a card having magnetic pulses on all ten "inner area" tracks.

Identification card recoding (updating)

Figure 11:
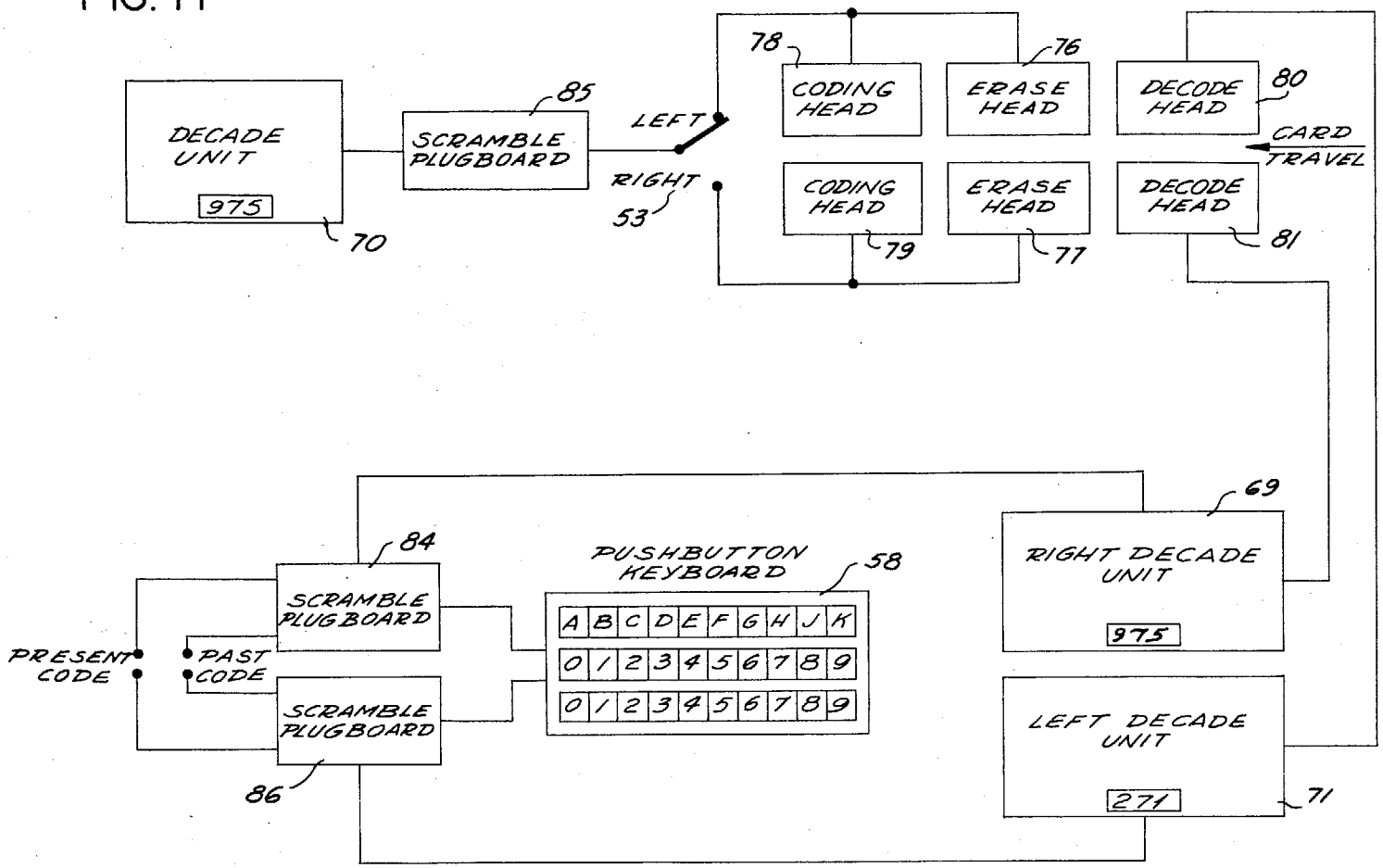
FIG. 11 is a block diagram illustrating the magnetic reading and writing functions of the apparatus.

As stated previously, in each instance in which either of the two codes (past or present) on the identification card is correct, the present period code may be rewritten on the card as one step of the admittance procedure. When desired, the security officer may arbitrarily change the present period code. The operation of the system, as shown in FIG. 11, in response to a change of the present period code, initiated by the security officer, is as follows: (1) assume that the individual's keyboard code number is A83, and the present period code is recorded on tracks 41, 42, and 43 on the left side of the card; (2) the past period code is recorded on tracks 55, 56, and 57 on the right side of the card; (3) the scrambler board 86 for the present period code decimal counters will relate A83 on the keyboard to 271 in decade unit 71; (4) the scrambler board 84 for the past period code decimal counters will relate A83 on the keyboard 58 to 531 in decade unit 69; (5) the card is to be re-encoded to result in the present code becoming the past period code and a new code to replace the former past period code when the entrant exits from the passageway.

With reference to FIG. 11, the following actions will ensue: (1) the entrant enters the passageway and depresses A83 on the keyboard 58 and inserts the identification card in the receiving opening; (2) both periods codes are read by means of decode heads 80 and 81, the card approved and the present period code (i.e. 271) is rewritten on the card, and the entrant is permitted egress from the passageway; (3) prior to the departure of any entrants from within the security area, the security officer changes the scrambler board 85 for the re-encoding decade unit 71 and places the re-encode switch S3 in the right side position corresponding to the past period code's location on the card which is to be changed to the new present period code. The new present period code may be 975, for example. Number A83 on the keyboard will now appear in the re-encoding decade unit 70 as number 975; (4) subsequently, when an entrant desires to leave the security area, the codes written on his identification card will be as in the initial instance (viz. 531 and 271); (5) the card is read by both left and right read head (80 and 81). The left and right codes are read and approved since the scrambler boards (84 and 86) associated with the left and right decade units 71 and 69 are unchanged. As the card passes under erase head 77, the right side is erased; (6) the card passes under coding head 79 and the new period code 975 is written in the erased area; (7) after all individuals within the security area have exited through the security system passageway, the security officer removes scrambler board 84 for the right decade unit 69 and inserts a board which is identical to scrambler board 85 used for the re-encoding. The decade unit 70 and decade unit 69 now bear the same relationship to the keyboard 58. The left decade unit 71 bears the same relationship to the keyboard as it did prior to the re-encoding and now becomes the past period code. Each time an individual passes through the gate, the present period code is written onto the card provided that one of the codes on his card is either a valid past or present period code.

It should be noted that before a new code is written on a card, or before the present period code is erased and rewritten, the original code must be read and approved. If the code on the card is not approved, the output of the erase and coding heads will be automatically turned off and the card will be ejected with the invalid code remaining therein.

Figure 6:
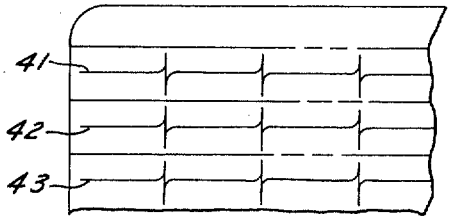
FIG. 6 is a fragmentary plan view of the card of FIG. 3 illustrating, in graphic form, details of the recorded data thereon.

The graphic representation of the encoded data in FIG. 6 is to be considered as an analogous representation of the magnetically recorded pulses rather than a literal representation thereof. That is, each pulse comprises a region of different magnetic flux as compared with surrounding areas. Non-return-to-zero (NRZ) recording may be employed, a technique well known to those skilled in the art.

Apparatus for writing the inner area codes on the identification card is not specifically set forth since this may be accomplished by any one of a number of techniques well known to those skilled in the art.

To accommodate admittance of authorized visitors, a group of keyboard combinations may be reserved for visitors.

An authorized visitor is initially cleared through a central security office where he is assigned a three-number keyboard code and is issued an identification card. The identification card is encoded with an appropriate period code in effect at the time of issue; a record of this card issuance would be kept in the central security office files.

It will be understood that various ommissions and substitutions and changes in the form and details of the system illustrated and its operation may be made by those skilled in the art without departing from the spirit and intended scope of the invention; for example, directional traffic lights (semaphore, or the like) may be installed at either end of each passageway to prevent interference caused by two entrants attempting to enter the passageway simultaneously, from opposite directions. When the passageway is clear, lights in either direction will show green. If the channel is entered from one side, the traffic light on the other side will turn red while the one on the entered side will remain green. This will establish a priority for heavy traffic in one direction. A time delay may be incorporated to restore the light at either end to a green condition after a period of 5 seconds, if no one enters from the priority side.

As can be seen, the invention permits one guard to serve a number of entrance gates. This is made possible since the duty of card inspection is removed from a guard who can then remain in a central location until notified by operation of alarms connected with the inspection apparatus that an unauthorized individual is attempting to enter the security area, or an error has been made in the operation of the system.

It will be recognized that by electrical communication with the apparatus of the invention, either directly or remotely, a signal may be selectively introduced into the system which will reject a particular card and thus prevent entry of a particular individual into the security area. This action may sound the alarm thus permitting the guard to direct the individual to a desired location for an interview, or otherwise detain him for other reasons.

The number that is assigned to each entrant is confidential and is known only to the card user and the security officer of the area.

If a number is not properly keyed and if, by reason of predetermined settings within the apparatus, the card is rejected, the card may be held locked in the card slot until released by an attendant or guard who will be summoned by the alarm actuated by the apparatus.

Since period code and inner area code assignments may be automatically changed whenever desired, old cards may be updated for use with new assignments, thus increasing the security afforded by this invention considerably.

The characteristic of the apparatus which generates various electrical signals permits an accurate tally of the number of persons entering and/or leaving a specified area. This may be accomplished by electrical connection of an electromechanical counter to the control apparatus. Furthermore, if desired, traffic from a secure area may be subtracted from traffic into the same area thus providing a running indication of the total number of individuals within the secure area at any given time. The adaption of other ancillary apparatus to the disclosed system will become apparent to those skilled in the art. Also, it should be understood that the identification card need not be limited to magnetic recording but may employ ferroelectric recording or other semipermanent recording techniques which will permit re-recording thereon. Furthermore, combinations of recording techniques may be employed in which certain of the codes on the card may be permanently made (i.e. inner area codes) whereas others may be capable of being changed as desired.

While there have been shown and described the fundamental novel features of the invention as applied to specific embodiments, it will be understood that various modifications in the form and details of the apparatus illustrated, and in its operation, may be made by those skilled in the art without departing from the spirit of the invention; therefore, it is intended that the invention be limited only as indicated by the scope of the following claims.

What is claimed is:

1. An electronic identification system employing a data bearing identification card comprising:

means for receiving said card;

means for sensing the data on said card; keyboard means for accepting a manually entered identification code;

data scrambling means connected to said sensing means for modifying the data sensed from said card in order to affect coincidence between said sensed data and said identification code;

means for comparing said manually entered identification code with the modified data sensed from said card; and means operable by said comparing means when said modified data coincides with said identification code to cause said receiving means to release said received card.

2. A system as defined in claim 1 including:

means for changing said data on said card after said comparing means has detected coincidence between said data and said identification code, and prior to release of said received card.

3. An electronic identification system comprising:

a data-bearing card;

means for receiving said card;

sensing means responsive to the data on said card to establish a first digital count;

keyboard means for accepting a manually entered preset code;

scramble board means connected with said keyboard means to provide a second digital count corresponding to a re-encoding of said preset code;

means for comparing said second digital count from said scramble board means with said first digital count from said sensing means; and means operable by said comparing means when said second digital count and said first digital count do not coincide, to cause a power circuit closure.

4. An electronic identification system as defined in claim 3 including:

means responsive to said comparing means for selectively changing said data on said card when said first digital count coincides with said second digital count.

5. An electronic identification system as defined in claim 3 including:

an alarm connected to said power circuit closure means, and responsive thereto to signal a lack of coincidence between said first digital count and said second digital count.

6. An electronic identification system as defined in claim 3 including:

a code scrambler connected between said sensing means and said comparing means and responsive to said keyboard means for re-encoding the data sensed from said card prior to its transmission to said comparing means, in accordance with said preset code.

7. An electronic identification system comprising:

a data-bearing card;

means for receiving said card;

sensing means responsive to the data on said card to provide a first digital count;

keyboard means for receiving a manually entered preset code;

scrambler means connected with said keyboard means and adapted to provide a second digital count corresponding to a re-encoding of said preset code;

means for comparing said second digital count from said scrambler means with said first digital count received in said sensing means; and power circuit means responsive to said comparing means when said first and second digital counts do not coincide, to cause a power circuit closure.

8. An electronic identification system as defined in claim 7 including:

means for selectively changing the data on said card if said comparing means detects coincidence between said first and second digital counts.

9. An electronic identification system as defined in claim 7 including:

an alarm connected to said power circuit means and responsive to the power circuit closure thereof to signal a lack of coincidence between said first and second digital counts.

10. An electronic identification system as defined in claim 7 including:

an electromechanical barrier connected to said power circuit means and operable in response to said power circuit closure.

11. An electronic identification system as defined in claim 8 including:

second scrambler means connected between said keyboard means and said selective changing means for re-encoding said preset code in accordance with the changes made in said data by said selective changing means.

12. An electronic identification system comprising:

a data-bearing card;

means for receiving said card;

sensing means responsive to the data on said card to establish a first digital count;

keyboard means for accepting a manually entered preset code;

scramble board means connected with said keyboard means and adapted to provide a second digital count corresponding to a re-encoding of said preset code;

means for comparing said second digital count with said first digital count; and means operable by said comparing means when coincidence exists between said first and second digital counts to release said card from said receiving means.

13. A plant security system for selectively controlling a barrier in a passageway in response to a code entered into a manual keyboard and a code automatically sensed from an identification card comprising, barrier means controlling the open and closed condition of said passageway, actuator means for operating said barrier means, means for receiving said card, means for sensing the code from said card, scrambling means for modifying the data sensed from said card in order to effect coincidence between said sensed data and the code entered into said keyboard, comparing means for comparing data from said keyboard with the modified data from said scrambled means, and means operable by said comparing means to energize said actuator means and control said barrier to maintain said passage in an open condition.

14. A plant security system as defined in claim 13 including means to automatically close said barrier means after a predetermined interval.

15. A plant security system as defined in claim 13 wherein said scrambling means includes means for selectively rearranging the code sensed from said card.

16. A plant security system as defined in claim 13 wherein said comparing means includes means for selectively rearranging the code from said keyboard.

17. A plant security system as defined in claim 13 wherein said means for sensing the code from said card is adapted to erase and re-encode the code on said card after sensing the data from said card.

18. A plant security system as defined in claim 13 wherein said barrier means comprises first and second gate means, and means responsive to said comparing means for selectively operating said gate means to close said passageway and thereafter open said passageway in response to identical codes being supplied to said comparing means from said scrambling means and said keyboard.

19. An electronic identification system for controlling the admittance of entrants through a passageway comprising, barrier means for controlling the open and closed condition of said passageway, means for selectively controlling said barrier means to permit an entrant to proceed through said passageway, said controlling means comprising means for receiving an encoded identification card carried by said entrant, keyboard means operable by said entrant to place a code in said controlling means, said card having thereon two distinct groups of encoded information, and comparing means for simultaneously reading both groups of information from said card and comparing same with the code placed in said controlling means from said keyboard means, said controlling means being responsive to said comprising means to open said barrier means to permit said entrant to proceed through said passageway when at least one group of information on said card compares with the information in said controlling means.

20. An electronic identification system as defined in claim 19 including detector means responsive to the presence of an entrant in said passageway for preconditioning said controlling means to selectively close said barrier means.

21. In a system as defined in claim 20 wherein said detector means comprises first and second treadle switches, said treadle switches being mounted on the floor of said passageway and adapted to be closed by said entrant when in said passageway.

22. In a system as defined in claim 20 wherein said detector means comprises first and second photoelectric means each responsive to first and second light beams, respectively, across said passageway, the output of said photoelectric means indicating the direction of travel of said entrant through said passageway as determined by the sequence in which said first and second light beams are interrupted.

23. An electronic identification system for controlling the admittance of entrants through a passageway comprising, barrier means for controlling the open and closed condition of said passageway, means for selectively controlling said barrier means to permit an entrant to proceed through said passageway, and controlling means comprising means for receiving an encoded identification card carried by said entrant, keyboard means operable by said entrant to place a code in said controlling means, and comparing means for reading the information encoded in said card and comparing same with the code placed in said controlling means from said keyboard means, said controlling means being responsive to said comparing means to open said barrier means to permit said entrant to proceed through said passageway when the information encoded in said card is identical to the information placed in said keyboard means.

24. An electronic identification system as defined in claim 23 including detector means responsive to the presence of an entrant in said passageway for preconditioning said controlling means to selectively close said barrier means.

25. In a system as defined in claim 23 wherein said detector means comprises first and second treadle switches, said treadle switches being mounted on the floor of said passageway and adapted to be closed by said entrant when in said passageway.

26. In a system as defined in claim 23 wherein said detector means comprises first and second photoelectric means each responsive to first and second light beams, respectively, across said passageway, the output of said photoelectric means indicating the direction of travel of said entrant through said passageway as determined by the sequence in which said first and second light beams are interrupted.

27. An electronic identification system for controlling the admittance of entrants through a passageway comprising, barrier means for controlling the open and closed condition of said passageway, means for selectively controlling said barrier means to permit an entrant to proceed through said passageway, said controlling means comprising means for receiving an identification card, carried by said entrant, having at least two distinctly different sets of data encoded thereon, keyboard means operable by said entrant to place a code in said controlling means, and comparing means for reading said sets of encoded data and comparing same with the code placed in said controlling means from said keyboard means, said controlling means being responsive to said comparing means to open said barrier means to permit said entrant to proceed through said passageway when said sets of encoded data coincide with the information in said controlling means.

* * * * *